Patented Mar. 9, 1943

2,313,463

UNITED STATES PATENT OFFICE 2,313,463

MANUFACTURE OF SPONGE RUBBER

William J. Clayton and Walter R. Hoover, Mishawaka, Ind., assignors to United States Rubber Company, New York, N. Y., a corporation of New Jersey No Drawing. Application June 13, 1940, Serial No. 340,320

3 Claims. (Cl. 260—815)

This invention relates to the manufacture of sponge rubber, and more particularly to the manufacture of sponge rubber from latex.

Sponge rubber is commonly made by whipping a latex composition into a foam, pouring the foam into molds, setting the foam to an irreversible gel by means of a gelling agent, such as an alkali silicofluoride, and drying and vulcanizing to form sponge rubber. The setting of the foam to an irreversible gel in the molds may be made to take place at room temperature, or the gelling action may be accelerated by raising the temperature. Generally, the latex compound is whipped up into a foam or froth before the gelling agent, and oftentimes before zinc oxide, is added, after which the alkali silicofluoride and zinc oxide are mixed into the foam in a mixing apparatus just prior to pouring into the molds in order to prevent premature gelling of the foam. The mixing apparatus may be equipped to whip the latex, or only to mix the sensitizer and zinc oxide into the foam which may be prepared in a separate whipper and transferred to the mixing apparatus. When the sensitized foam is poured into the molds, there remains in the mixing apparatus, and on the mixing paddles or whipping wires, or the like, a certain amount of latex foam which must be removed before a new batch of latex foam is mixed therein. Further, unless this waste foam can be salvaged or recovered, and utilized in the process, it represents a by-product of very little value.

The present invention relates to a method of recovering the waste latex foam remaining in the mixing apparatus after pouring the foam into molds in such a condition that it may be added to a new latex mix before foaming without detrimentally affecting sponge rubber prepared from such a latex composition containing both new latex mix and recovered foam.

According to the present process, the waste latex foam remaining in the mixing apparatus after the pouring operation and before it has set to an irreversible gel, is dispersed in a wash liquid comprising an aqueous medium containing small amounts of an alkali hydroxide and a material capable of precipitating zinc ions, such as an alkali tetraborate, or carbonate, or metaphosphate. By "dispersing" the foam in the aqueous medium is meant the breaking up of the foam structure and the dissemination of the suspended rubber particles in the latex films comprising the wall structure into the aqueous medium of the wash liquid. The alkali hydroxide prevents precipitation of the rubber particles which would otherwise take place by virtue of the gradual hydrolysis of the silicofluoride. The term "alkali hydroxide" is used herein in its commonly accepted sense as inclusive of ammonium and alkali-metal hydroxides, but exclusive of polyvalent metal hydroxides. The use of alkali hydroxide alone for dispersing the foam and recovering the rubber therein is not satisfactory because a wash liquid containing rubber recovered by means of alkali hydroxide alone becomes thick and loses much of its mechanical stability on standing, and it has been found that the addition of such a wash liquid to a new latex mix shows a decidedly detrimental affect on the flexing characteristics of final sponge rubber made from such mixture, even though the amount of rubber from the wash liquid amounts to only a few percent of the total rubber in the new latex composition. It has been found that the addition to the aqueous solution for dispersing the foam of a material capable of precipitating zinc ions, such as an alkali tetraborate, or carbonate, or metaphosphate, in addition to the alkali hydroxide, prevents thickening and destabilizing of the wash liquid on standing and permits storage of the wash liquid, even where it has been built up to a rubber content of 50% or greater, for any length of time necessary in commercial operations. In practice the foam remaining in the mixer, and adhering to the mixing paddles or whip wires, and to other parts of the mixing apparatus, is dispersed in a body of the wash liquid after each batch of foam is poured, and the rubber content of the wash liquid is built up from the foam remaining after such successive batches until the rubber content of the wash liquid reaches the desired concentration. Sufficient foam may readily be dispersed in the wash solution to bring the rubber content to 40% or more, at which concentration, the wash liquid may be added to a new latex mix, in preparing a latex composition for foaming, without unduly changing the rubber concentration of the same. Such wash or recovery liquid may be added to a new latex mix for frothing in an amount such that the rubber from the wash liquid is 15% or more of the rubber content of the new latex mix. In practice, no more than 5% rubber recovered in the wash liquid, referred to the rubber in the new latex mix, need be added in preparing a fresh latex composition for foaming in order to utilize all the recovered rubber in the process. The amount of alkali hydroxide in the wash liquid should be sufficient so that the pH after the total desired amount of foam has been dispersed therein, is at least 8 and preferably 9. Wash solutions containing from 1% to 5% potassium hydroxide have been found satisfactory. Ammonium hydroxide or sodium hydroxide may similarly be used, but potassium hydroxide is the preferred alkali. The amount of material capable of precipitating zinc ions, such as alkali tetraborate, carbonate, or metaphosphate that is added to the wash liquid is not critical. Wash solutions containing 1% to 10% of borax, which is the preferred material capable of precipitating zinc ions, have been found satisfactory. The term "alkali" as referring to the tetraborates, carbonates, and metaphosphates, which are exemplary of various common materials capable of precipitating zinc ions, is used in its commonly accepted sense as inclusive of the ammonium and alkali-metal salts but exclusive of the polyvalent metal salts.

The following example is illustrative of the present invention. A latex composition of the following formulation was whipped into a foam in a conventional Hobart whipper:

| New latex mix: | Dry weight |
|---|---|
| Rubber (as 60% concentration latex) | 100 |
| Soap | 1.5 |
| Sulphur | 2 |
| Antioxidant | 1 |
| Accelerator | 2 |
| Recovered wash liquid: | |
| Rubber (as 40% concentration wash liquid) | 5 |

After whipping to the desired foam density, the foam was transferred to a mixing apparatus equipped with stirring paddles and was sensitized by mixing therein 3 parts of zinc oxide and 1 part of sodium silicofluoride. The latex was then poured into molds, set to an irreversible gel in 8 minutes by heating at 80° F., and vulcanized, washed, and dried to final sponge rubber. The foam remaining in the mixer and adhering to the paddles was dispersed in an aqueous solution containing 2% potassium hydroxide and 2% borax by stirring the wash solution in the mixer for a short time to break up the foam structure and disseminate the rubber particles in the wash liquid. The foam remaining in the mixing apparatus from subsequent batches was similarly dispersed in the same wash solution containing potassium hydroxide and borax until a concentration of about 40% rubber had been built up. Such a wash liquid containing 40% rubber previously prepared in this manner is the "recovered wash liquid" included in the latex compound in the above formulation. Other formulations of latex compositions for foaming containing amounts of wash liquid equivalent to up to 15 parts or more rubber content per 100 parts rubber content of new latex mix, and containing from 1 to 10 parts of borax, and from 1 to 5 parts of potassium hydroxide, may readily be used, all with excellent results as to stability of the wash liquid in storage, and without any deteriorating effect on the flexing characteristics of cushions made of sponge rubber prepared from the latex foam.

In view of the many changes and modifications that may be made without departing from the principles underlying the invention, reference should be made to the appended claims for an understanding of the scope of the invention.

Having thus described our invention, what we claim and desire to protect by Letters Patent is:

1. The method of recovering a stable liquid composition from ungelled latex foam containing zinc oxide and alkali silicofluoride which comprises dispersing said foam in an aqueous medium containing an alkali hydroxide and material selected from the group consisting of alkali borates, alkali carbonates, and alkali phosphates.

2. The method of recovering a stable liquid composition from ungelled latex foam containing zinc oxide and alkali silicofluoride which comprises dispersing said foam in an aqueous medium containing an alkali hydroxide and borax.

3. The method of recovering a stable liquid composition from ungelled latex foam containing zinc oxide and alkali silicofluoride which comprises dispersing said foam in an aqueous medium containing potassium hydroxide and borax.

WILLIAM J. CLAYTON.
WALTER R. HOOVER.